Nov. 13, 1956 W. A. ZARTH 2,770,033
METHOD OF SOLDERING A THIN BERYLLIUM
MEMBER TO A METAL PART
Filed June 14, 1951

INVENTOR
WILLIAM A. ZARTH
BY John C. Dorfman
ATTORNEY

United States Patent Office 2,770,033
Patented Nov. 13, 1956

2,770,033

METHOD OF SOLDERING A THIN BERYLLIUM MEMBER TO A METAL PART

William A. Zarth, Stamford, Conn., assignor to Machlett Laboratories, Incorporated, Springdale, Conn., a corporation of Connecticut Application June 14, 1951, Serial No. 231,457

2 Claims. (Cl. 29—488)

This invention relates to beryllium objects and the method of their manufacture. In particular it concerns a novel method of plating beryllium and a novel method of soldering beryllium vacuum-tight to a support.

Beryllium is frequently soldered to another metal when it is to be used as an X-ray transparent window for an X-ray tube. In making beryllium windows, it has been found expedient to first solder a beryllium disk vacuum-tight to bezels, thereafter accomplishing the relatively easy job of affixing the bezels to the tube envelope. This not only makes it easier to work with the rather brittle beryllium disk but adds strength and rigidity to the window assembly. My invention particularly concerns an improved beryllium window assembly of this sort, i. e., a berryllium window solder vacuum-tight to metallic bezels, and the method of making this assembly.

Beryllium has a marked tendency to alloy with other metals and specifically to alloy with those metals and alloys used as brazing solders. Alloying is often undesirable because many alloys of beryllium are even more brittle than the pure metal. Beryllium alloys containing copper or similar metals in smaller amounts than beryllium are particularly brittle. Nevertheless, the use of silver, copper, or other low melting point brazing metals in soldering beryllium windows to bezels has remained common practice in the X-ray art simply because no satisfactory substitute has been available. When copper, or a high copper alloy, has been used, alloying with the beryllium has extended at least .020 to .030 inch into the disk on both sides of the window. This alloying has left only a thin layer of less brittle pure beryllium sandwiched between the alloy layers. Thus weakened, the window assemblies have been able to withstand only minor mechanical shocks without rupture of the vacuum seal.

Accordingly it is an object of my invention to prevent extensive alloying of the beryllium when soldering beryllium to a suitable support. As a result of the reduced alloying, it is possible to produce rugged beryllium window assemblies and other beryllium objects which are capable of withstanding more severe mechanical shock than prior art structures. Thus, this invention effectively boadens the scope of use of beryllium.

I accomplish this object by use of a novel process in which hydrides of metals are employed. Hydrides of metals have been used extensively in the prior art for making ceramic to metal vacuum seals, but they have not been used commercially to form metal to metal bonding means. The fineness of division of the hydride particles makes it possible to supply a relatively uniform, thin layer of hydride over a surface. I have discovered that such a layer of hydride may be used to form a thin insulating layer between the beryllium and the soldering material used to seal it to its bezels. Upon heating, this hydride layer prevents the molten solder from so readily alloying with the beryllium, and at the same time it reduces to the pure metal so that the seal from beryllium to support is all metal. As reduction of the hydride takes place, the nascent hydrogen given off seems also to inhibit the alloying with the beryllium and, in addition, reduces any oxides present.

The use of hydrides of metals prevents alloying beyond several thousandths of an inch into the beryllium at each soldered surface. This makes possible very satisfactory window assemblies, but it is possible to have an even higher percentage of good windows if the alloying is inhibited even further. I have discovered that plating the beryllium in the region to be sealed further reduces alloying. However, there has been no means known to the art of plating any metal onto beryllium sufficiently well to form the basis of a vacuum seal. I concluded that the reason beryllium has not been successfully plated in the past is the almost instantaneous formation of beryllium oxide upon the surface of the metal when exposed to air. By the novel process described below I prevented the formation of oxides and successfully plated beryllium for the first time. Upon using the plated beryllium in the soldering process employing hydrides of metals, seals entirely free of beryllium alloy were formed.

Thus, it is another object of my invention to plate all plating metals onto beryllium. Whereas it is my primary purpose to plate the edges and adjacent regions of beryllium windows in order to make possible vacuum-tight seals between beryllium windows and their supports, the plating process is valuable for plating any other beryllium object. It is my purpose to plate beryllium with any common plating metal whether that metal be satisfactory for use in making beryllium window assemblies or not.

Beryllium windows have proved valuable in permitting more complete use of the X-ray energy produced by X-ray tubes. It has been known that even lower X-ray attenuation, hence higher X-ray transparency, is possible where thinner beryllium windows are used. Furthermore, very thin beryllium windows permit the passage of soft X-rays which are normally wholly attenuated by windows of conventional thickness. Many applications for soft X-radiation unaccompanied by hard radiation have been developed, e. g., micro-radiography and various types of superficial therapy. Unfortunately, the benefits of soft radiation have not been widespread because thin beryllium windows have not been available for the manufacture of thin window tubes. Recent improvements in the techniques for obtaining thin beryllium sheets have made beryllium of satisfactory thickness available. However, soldering techniques in common use for thicker beryllium windows have proved entirely unsatisfactory for thin windows.

Accordingly, it is still another object of my invention to produce vacuum-tight windows of very thin beryllium. These thin beryllium windows may be less than .010 inch thick. The fact that alloying usually occurs to a depth of .020 to .030 inch makes it obvious that thin windows made by conventional techniques are supported only by brittle beryllium alloy. Furthermore, the fact that the window is so thin permits alloy to form out into the window area itself, thus destroying uniformly high transparency of the window. With my process the alloying is negligible in amount or not present. Even using the hydride without plating the beryllium, my experiments show alloying confined to layers less than .001 inch in thickness.

For a better understanding of this invention reference is made to the following drawings.

Figure 1:
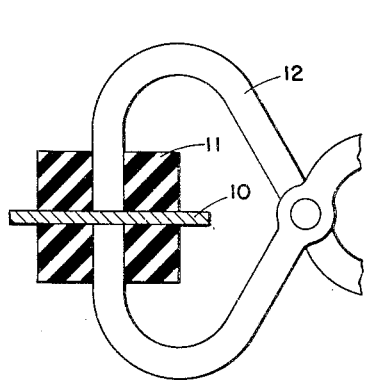
Fig. 1 illustrates the holding means by which a beryllium window is introduced into and held within a plating bath.

Referring to Fig. 1, in the typical beryllium brazing operation of soldering a beryllium window to its support, a disk 10 of pure beryllium is first selected for the window material. This disk is cleaned in a conventional manner and thereafter placed between the jaws of tongs, which may be of any convenient type or shape, as shown in Fig. 1. A washer 11 of rubber or other dielectric material masks the window portion leaving exposed the edge and a band on both sides of the disk adjacent the edge. Washer 11 fits snugly around the jaws of tongs 12, a metallic portion of which contacts the beryllium disk 10. The disk 10, thus masked, is immersed in etching solution, which may be 10% hydrofluoric acid in water, in order to remove impurities and to provide a roughened surface to aid the adhesion of the plating. Thereafter, without rinsing, the disk, still held by the tongs, is placed in a plating bath. The electro-plating circuit is completed through disk 10 to tongs 12. Due to the masking, the etching and plating respectively will be confined to the edge of the beryllium disk and to a portion of both sides of the disk forming a ring adjacent its edge around the actual window area. Plating under these circumstances is possible because the etching solution has removed all oxide and surface corrosion. Since the etching solution is allowed to remain on the beryllium disk until its immersion in the plating bath, the metallic beryllium is not again exposed to air. It is such exposure to air which has caused immediate oxidation of the beryllium in the past and thus prevented its plating. Once the beryllium is in the plating solution, conventional plating procedures may be used. In the usual case, copper is used for this plating operation, but silver, chromium and tin have been successfully plated onto beryllium using this method and it would seem possible to plate any of the common plating materials in this same way.

Figure 2:
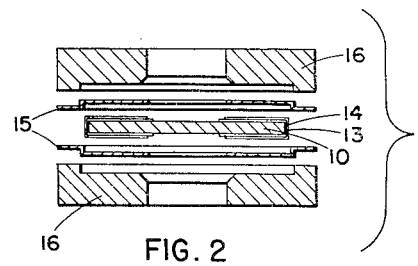
Fig. 2 is an exploded sectional view of the window assembly illustrating the various layers of material used.

In order to carry out the brazing operation the parts are assembled as indicated in Fig. 2. Atop the copper plating 13 a layer of powdered hydride 14 in a suitable vehicle may be painted. This hydride may be titanium hydride, zirconium hydride or other hydrides of metals having similar properties in a vehicle such as amyl-acetate and alcohol. This procedure permits a smooth thin film of hydride to be uniformly deposited on the plated area. Cup shaped washers of solder material 15 are then placed on both sides of the disk atop the hydride layer 14. Silver solder is commonly used in soldering beryllium windows to their supports, but copper and copper alloys, such as that described in Patent Number 2,534,643 issued to J. G. Warner, may be used. Metallic bezels 16 are placed atop the solder. These annular supports may be of the various materials having appropriate coefficients of expansion, such as Monel.

Figure 5:
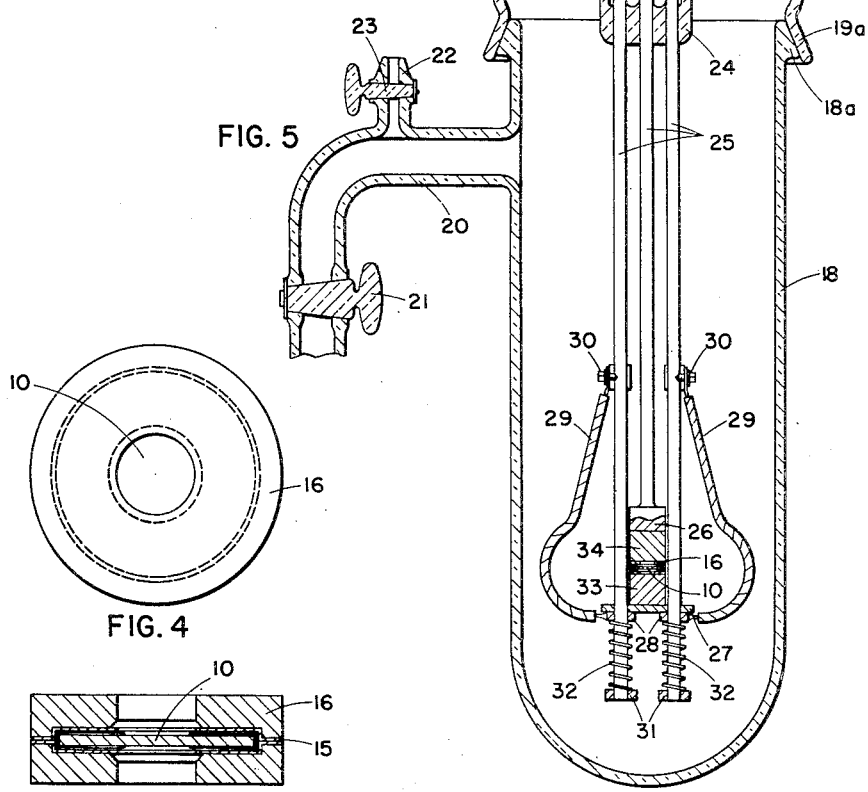
Fig. 5 shows the window assembly positioned in apparatus used for soldering it together.
Figure 4:
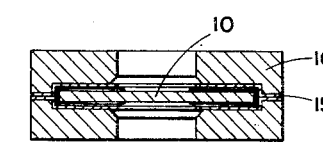
Fig. 4 shows an elevational view of the window assembly.
Figure 3:
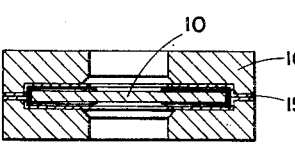
Fig. 3 illustrates the assembly ready to be soldered.

When assembled as shown in Fig. 3 and 4, the actual brazing or soldering operation may be carried on in the apparatus shown in Fig. 5 or in any equivalent apparatus. The apparatus used may employ resistance heating or other brazing heating known to the art. The apparatus shown has a vacuum container which consists of a glass vacuum jar 18 having an opening at one end which may be closed by removable cap 19. The vessel is provided with a peripheral flange 18a surrounding the opening and receivable within the rim 19a of the cap, the engaging surface of the flange and cap being ground so that the cap may be mounted on the vessel with a vacuum tight joint. The vessel is provided with an outlet tube 20 containing a stop-cock 21, beyond which the tube may be connected to the intake of a vacuum pump system to evacuate the interior of the vessel. The outlet tube is also provided with a vent 22 leading to the atmosphere and controlled by stop-cock 23. The cap 19 is formed with a re-entrant end 24 through the wall of which are sealed a plurality of stiff conducting rods 25. In the construction illustrated, the rods are arranged in a row and the central rod carries at its lower end a block 26 made of refractive conductive material, such as moylbdenum. A plate 27 also made of refractive conductive material such as molybdenum is mounted for sliding movement on the outer rods 25 and beneath plate 27, the rods are encircled by conducting rings 28, each of which is connected by a flexible conductor 29 to a clamp 30 lying a substantial distance upwardly from the lower ends of its rod. Each of the outer rods 25 is provided with a stop 31 at its lower end and a spring 32 encircling the rod engages the stop and the conductive ring 28 on the rod and urges the ring and support 27 upward toward the fixed block 26. In the use of the apparatus, the assembly is placed upon a block 33 of carbon or other high resistance material which rests on plate 27 and a block 34 of like material engages the top of the assembly and the lower surface of block 26. The outer rods 25 are connected to a conductor 35 and the central rod is connected to a conductor 36. These conductors receive current at low voltage as described in the Warner Patent Number 2,534,643.

In using the apparatus the cover of the vessel is removed and the assembly, as shown in Fig. 3, is placed between the high resistance blocks 33 and 34 which lie between block 26 and 27. The springs 32 cause the parts of the assembly to be forced tightly together and when the assembly has been properly mounted in the clamping device, the cover is reseated on the vessel, the vent cock 23 is closed, the cock 21 is opened and the pumping system is started to evacuate the vessel. A vacuum of 1 to $1.5 \times 10^{-4}$ mm. of mercury should be obtained before soldering is begun. When the desired degree of vacuum has been obtained current is caused to flow through conductor 35 and 36, the rods 25, block 26 and plate 27, the high resistance blocks 33 and 34, and the assembly between the blocks 33 and 34. The high resistance blocks are quickly heated by the passage of current therethrough and the assembly is heated by conduction from those blocks. The heating is continued until solder 15 begins to flow and is thereafter discontinued.

The time required for a particular brazing operation may vary depending upon the size of the various components. The time for any given dimensions may be determined and thereafter all timing for such operations may be automatically controlled by timers. With some practice judging when the solder has flowed may be done by observing change in texture of the solder between the bezels while heating. Another means of determining when soldering occurs is by noting the increase in pressure within the bell, due to liberation of nascent hydrogen and reduction of the hydride to metal. As mentioned previously this hydrogen does not produce harmful results and in fact aids in the soldering, in that it tends to reduce oxides on the metallic surfaces. Slow cooling within the vacuum is desirable. After cooling the soldered assembly is ready to be finally soldered into place on a tube envelope.

Actually a beryllium object may be soldered to its support either without first plating the beryllium or without the use of hydrides. In either case alloying will occur only near the surface of the beryllium. The results with hydride alone are particularly good, the alloy penetration being only a few thousands of an inch into the metal. When both plating and hydride are used, however, even repeated heating of the assembly in a hydrogen furnace at temperatures in the rnaeg of 800° C. fails to produce any measurable penetration of solder. In fact, no further alloying has been noticed even upon reheating to temperatures only slightly below the solder's melting point.

Plating of materials onto beryllium will find applications in many other X-ray fields and possibly in non-X-ray fields. For instance, it is proposed to plate a very thin layer of metal, probably only a few molecules thick, onto beryllium, and thereafter electrodeposit or evaporate films useful as X-ray filters. Subsequent plating where desired on top of the first layer may be done in conventional manner, rinsing or cleaning the piece before placing it in the plating bath.

I claim:

1. A method of soldering a thin piece of beryllium vacuum-tight to a support wherein the beryllium surface is cleaned, thereafter the beryllium surface is etched in a suitable etching solution, then transferred without rinsing and while still covered with the etching solution directly into a solder wettable metal plating solution and plated, a layer of hydride of a metal is applied atop the plated area, brazing solder is placed atop the hydride, the support is placed atop the solder, and, when thus assembled, the solder is melted in a vacuum furnace and caused to flow sufficiently to complete the vacuum-tight bond between the beryllium and its support.

2. A method of soldering a beryllium member of very thin dimension to a metal part by use of silver solder, comprising cleaning the member, etching the member in a suitable etching solution, transferring the member without washing and while still covered with etching solution directly into a solder wettable metal plating solution, plating the member, applying to the plated member a layer of hydride of metal, applying silver solder upon the layer of hydride, and subsequently soldering in a vacuum furnace.

References Cited in the file of this patent

UNITED STATES PATENTS

| | | |
|---|---|---|
| 1,804,237 | Steenstrup | May 5, 1931 |
| 2,000,845 | Jonas et al. | May 7, 1935 |
| 2,085,587 | Hotchkiss | June 29, 1937 |
| 2,123,384 | Stilliman | July 12, 1938 |
| 2,235,965 | Ness | Mar. 25, 1941 |
| 2,310,567 | Atlee | Feb. 9, 1943 |
| 2,310,568 | Atlee | Feb. 9, 1943 |
| 2,340,362 | Atlee et al. | Feb. 1, 1944 |
| 2,512,455 | Alexander | June 20, 1950 |
| 2,534,643 | Warner | Dec. 19, 1950 |
| 2,570,248 | Kelley | Oct. 9, 1951 |
| 2,588,734 | Kolodney | Mar. 11, 1952 |
| 2,685,125 | Hansen et al. | Aug. 3, 1954 |

FOREIGN PATENTS

| | | |
|---|---|---|
| 309,032 | Great Britain | Oct. 24, 1929 |
| 446,439 | Great Britain | Apr. 30, 1936 |
| 547,755 | Great Britain | Sept. 9, 1942 |